United States Patent [19]

Donahoe

[11] 4,184,240
[45] Jan. 22, 1980

[54] APPARATUS AND METHOD FOR ASSEMBLING AUTOMOTIVE GEAR REDUCTION STARTER DRIVE ASSEMBLY

[76] Inventor: Thomas M. Donahoe, 1604 S. Waverly Pl., Melbourne, Fla. 32935

[21] Appl. No.: 887,819

[22] Filed: Mar. 17, 1978

[51] Int. Cl.² .............................................. B23P 19/04
[52] U.S. Cl. ....................................... 29/229; 29/238; 29/235; 29/267; 29/453
[58] Field of Search ................. 29/732, 238, 229, 235, 29/267, 450, 453, 281.5

[56] References Cited

U.S. PATENT DOCUMENTS

| | | | |
|---|---|---|---|
| 331,147 | 11/1885 | Mallinckrodt | 29/267 X |
| 1,482,127 | 1/1924 | Glick | 29/267 |
| 2,623,275 | 12/1952 | Holmquist | 29/267 X |
| 2,680,287 | 6/1954 | Wilson | 29/238 X |
| 3,099,875 | 8/1963 | Lelis | 29/267 X |
| 3,182,388 | 5/1965 | Hart et al. | 29/267 |
| 3,521,346 | 7/1970 | Tongurian | 29/281.5 |
| 3,833,992 | 9/1974 | Moulin | 29/235 |
| 3,871,055 | 3/1975 | Dail | 29/267 |
| 4,003,340 | 1/1977 | Carnahan | 29/235 X |

*Primary Examiner*—Charlie T. Moon
*Attorney, Agent, or Firm*—Richard D. Dixon

[57] ABSTRACT

The present invention relates to a foot-actuated press assembly adapted to hold and operate upon an automotive gear reduction starter drive assembly having a housing with a gear reduction shaft rotatable between two bore bushings therein. The foot-actuated press assembly includes a frame and a support plate coupled to the frame. A pair of alignment dows are coupled to the support plate for engaging bolt holes located in the starter drive housing for locating a rotational axis of the gear reduction shaft in known registration with the frame. A locking device is coupled to the support plate for being movably juxtaposed adjacent to the support plate for locking the starter drive housing therebetween.

A plunger rod is movably coupled to the frame in registration with the alignment dows for operatively coupling with and exerting an axial pressure on the gear reduction shaft in a direction toward the support plate. A foot actuator is coupled to the frame and to the plunger rod for being depressed by the foot of the operator, thereby forcing the plunger rod into communication with a first end of the gear reduction shaft. A shaft holder is also coupled to the frame adjacent the plunger rod but spaced from the support plate. The shaft holder is located in known registration with the plunger rod and the alignment dows for receiving and locating the gear reduction shaft with a second end thereof adjacent to the first one of the bore bushings.

A tapered sleeve is provided to receive and expand thereon a retainer ring. As the tapered sleeve is forced through one of the bore bushings by the gear reduction shaft and the plunger rod, the retainer ring is expanded and forced onto the larger gear reduction shaft for being mated with its appropriate groove therein.

8 Claims, 2 Drawing Figures

U.S. Patent
Jan. 22, 1980
4,184,240
FIG. I
FIG. II
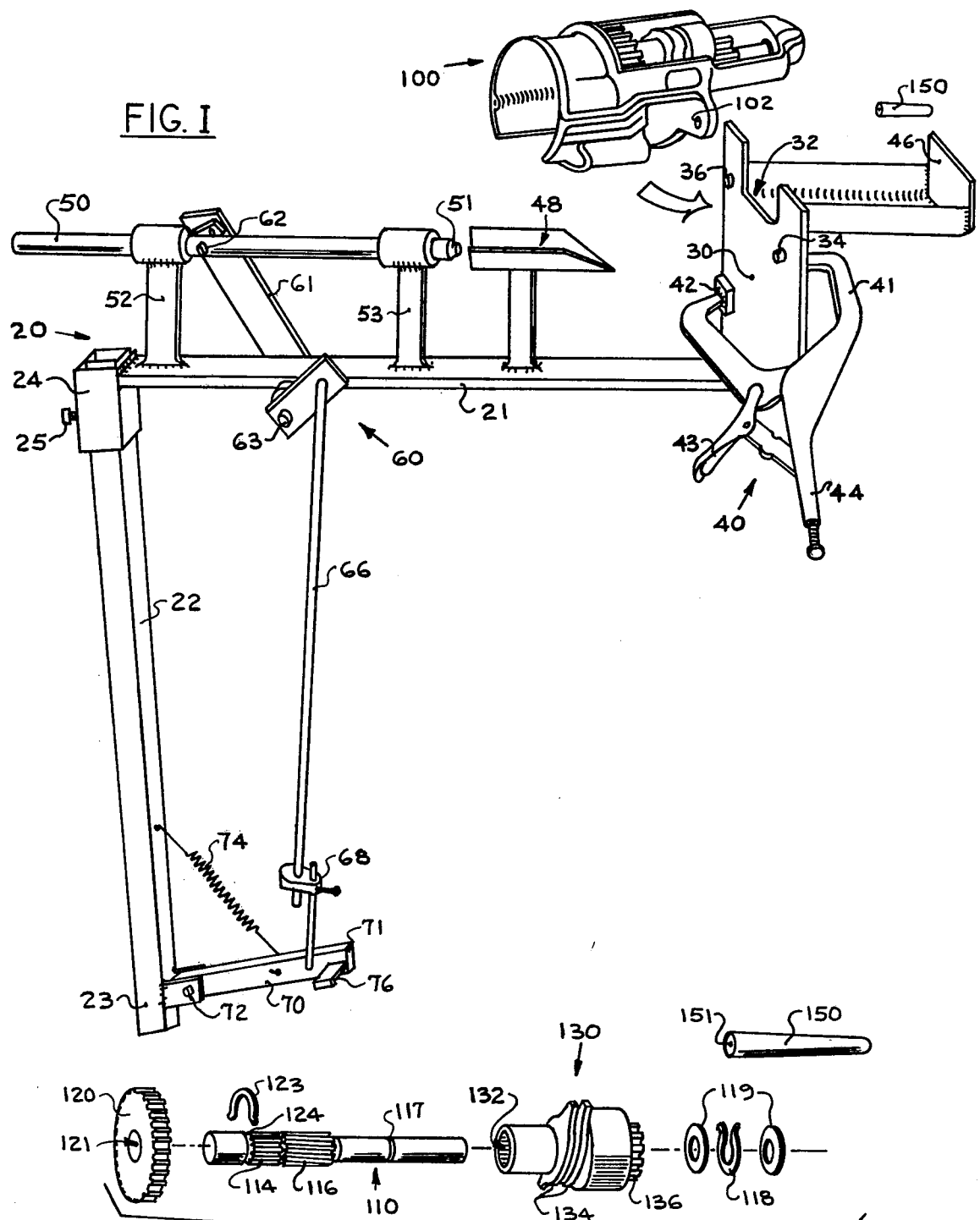

APPARATUS AND METHOD FOR ASSEMBLING AUTOMOTIVE GEAR REDUCTION STARTER DRIVE ASSEMBLY

BACKGROUND OF THE INVENTION

I. Field of the Invention

This invention relates to a tool and a method for aiding in the building or refurbishing process for a gear reduction assembly for an automotive starter. More specifically, the present invention relates to an apparatus for disassembling, reworking and assembling a gear reduction drive system of the type employed by the Chrysler Corporation in its automobile and light truck engines.

II. Description of the Prior Art

Automotive starter motors and drive assemblies have long been known in the trade to present reliability problems in that it is not unusual for the starter system of the automobile to fail or wear out long before the engine requires substantial mechanical work or rebuilding. Many smaller companies have specialized in rebuilding starter systems of this type since a large majority of the parts salvaged from a defective starter assembly may be refurbished at minimum expense. The critical or high-tolerance items may be replaced or remachined in order to provide the required tolerances and reliability. While these starter assemblies may be disassembled, refurbished, and reassembled without requiring a great investment in machine tools, test facilities, etc., it is nevertheless important to minimize the labor required in disassembling and reassembling the starter assemblies if the manufacturer is to maintain a cost-competitive posture when reselling the refurbished starter assemblies. The elimination of only one or two hours of labor and the concommitent expense associated therewith can easily allow a small manufacturer or refurbisher to gain a disproportionately large share of this type of business due to a proportionate reduction in the final cost of the refurbished starter assemblies.

The General Motors Corporation and the Ford Motor Corporation have generally designed their automobile starter assemblies to employ a solenoid actuated starter motor having an armature shaft which directly couples with the flywheel of the engine. In contrast with this design, the Chrysler Corporation has for many years employed a gear reduction system between the armature shaft of the starter motor and the flywheel of the engine. In this manner additional torque may be obtained in order to more efficiently initiate the rotation of the engine. While the apparatus in accordance with the present invention could be utilized in the process or refurbishing a General Motors or Ford Starter system, it is nevertheless envisioned that the present apparatus will be more suitably employed during the refurbishing process of the Chrysler Corporation type starter motor and gear reduction assemblies.

The inventor, during the course of remanufacturing and refurbishing a large number of the Chrysler starter motor assemblies, has expended a great deal of effort in investigating all of the presently utilized systems and machines for refurbishing the Chrysler gear reduction starter systems. Typical of the methods presently being used in constructing or refurbishing these gear reduction starter systems is the method presently employed by the Chrysler Corporation when initially assembling new starter systems. Chrysler presently utilizes hand labor unassisted by automated machines for coupling the gear retainer locks into the appropriate groove within the gear reduction shaft while inserting the gear reduction shaft into the starter drive housing and attaching the main reduction gear and the starter drive gear thereto. This manual process requires a great deal of skill and patience, and it is not unusual for such an assembly process to require 10 to 15 minutes or more. In contrast with this manual assembly system, the use of the apparatus in accordance with the present invention allows the disassembly and reassembly of the gear reduction drive system in less than 3–4 minutes by a semi-skilled worker. The obvious time and labor expense savings are obvious when the apparatus in accordance with the present invention is utilized on a high volume basis.

Several United States Patents have been issued for assembly or refurbishings jigs, but none of these references apply to assist in obtaining a solution to the problem at hand. For example, Dail, in U.S. Pat. No. 3,871,055, discloses a foot-actuated press for engaging a horizontal workpiece. The press employs a plunger rod which extends through an opening in a particular work piece in order to engage a movable section thereof. The Dail apparatus, while similar in some respects to the present invention, cannot readily be modified or redesigned in order to perform the alignment, disassembly and reassembly functions of the present invention. Another foot-actuated assembly and work-holding device for machine shops is disclosed by Lelis in U.S. Pat. No. 3,099,875.

Other prior art references do not aid in obtaining information on an apparatus similar in design to the preferred embodiment of the present invention. For example, Hart in U.S. Pat. No. 3,182,388, discloses a device for separating telescoped elements employed in an automotive muffler and tailpipe combination. Wilson, in U.S. Pat. No. 2,680,287, discloses a four-wheeled dolly for supporting motor vehicle parts during the repair and refurbishing process. Holbrook, in U.S. Pat. No. 3,380,149 discloses an apparatus and method for establishing certain pre-determined relationships between the roll mechanisms employed in an automotive odometer. Spytek, in U.S. Pat. No. 3,257,716, discloses an apparatus for extracting the seals carried by a housing of a motor vehicle transmission assembly. Tongurian, in U.S. Pat. No. 3,521,346, discloses a machine for reconditioning and setting up clutches of motor vehicle engines. Okazaki, in U.S. Pat. No. 3,793,718, discloses an apparatus utilized to assist in the mounting and dismounting of a piston through the crankshaft side of the cylinder of a reciprocating internal combustion engine. McDaniel, in U.S. Pat. No. 3,925,872, discloses a tool for aligning the bolt holes in a timing-chain cover with the matching holes in the front of an engine. None of these references provide any assistance in illustrating an apparatus or method which would greatly simplify the disassembly, and reassembly steps involved in refurbishing starter motor gear reduction drive systems of the type referenced herein.

Therefore, the first object of the present invention is to define an apparatus which may be utilized to hold the gear reduction drive assembly during the disassembly, refurbishing, and reassembly steps. The apparatus must assist in holding the constituent parts in relative physical relationship with the required positions and provide certain alignment functions for reducing the skill required to properly integrate the constituent parts. A second object of the present invention is to integrate with this apparatus a foot-actuated mechanism whereby the operator may employ both of his hands to aid in the alignment and assembly process while at the same time controlling the insertion and assembly of the various parts by the use of his feet.

SUMMARY OF THE INVENTION

This invention relates to a foot-actuated press assembly adapted to hold and operate upon an automotive starter drive housing of the type having therein a gear reduction shaft rotatable between two bore bushings. The assembly comprises a frame, and a support plate coupled to the frame. The support plate includes thereon alignment dows for coupling with bolt holes in the starter drive housing in order to locate a rotational axis of the gear reduction shaft in known registration with the frame. Locking means are coupled to the support plate for being movably juxtaposed adjacent the support plate for locking the starter drive housing therebetween. Plunger rod means are movably coupled to the frame in registration with the alignment dows for operatively coupling with and exerting an axial pressure on the gear reduction shaft in a direction toward the support plate. Foot-actuator means are coupled to the frame and to the plunger rod means for being depressed by the foot of the operator, thereby forcing the plunger rod means into communication with a first end of the gear reduction shaft.

A method is also disclosed for coupling a retainer ring of smaller inside diameter onto the larger diameter gear reduction shaft. The retainer ring is placed upon a tapered sleeve and the sleeve is forced through one of the bore bushings by the gear reduction shaft and the plunger rod, thereby expanding the retainer ring and forcing it onto the larger gear reduction shaft.

BRIEF DESCRIPTION OF THE DRAWINGS

Other objects, features and advantages of the present invention will be apparent from a study of the written description and the drawings, in which:

FIG. 1 illustrates a frontal perspective view of the first preferred embodiment of the apparatus in accordance with the present invention together with the starter motor gear reduction drive assembly for being coupled thereto.

FIG. 2 represents an exploded view of the parts and elements comprising the starter motor gear reduction drive assembly of the type operated upon by the first preferred embodiment of the present invention.

DETAILED DESCRIPTION OF THE PREFERRED EMBODIMENT

The preferred embodiment of the present invention is shown generally in FIG. 1. The apparatus includes a frame 20 having a horizontal member 21 and a vertical member 22. A sleeve 24 is coupled to one end of the horizontal frame member 21 and has a shape generally congruent with the circumference of the vertical member 22 for closely coupling and guiding therewith. An adjustable bolt 25 is utilized to retain the fixed angular and spatial relationship between the horizontal member 21 and the vertical member 22, while allowing independent height adjustments therebetween. A lower end 23 of the vertical frame member 22 is generally adapted to be secured to a floor mounting element (not shown) to provide strength and rigidity to the frame 20. Likewise, other parts of the frame 20 may be secured to a workbench or other such objects in order to immobilize the frame.

A substantially vertical oriented drive housing support and alignment plate, shown generally as 30 in FIG. 1, is coupled to the opposite end of the horizontal frame member 21 from the sleeve 24. This alignment plate 30 includes therein a housing cutout 32 in a top section thereof for allowing a starter drive housing 100 to communicate therewithin. The alignment plate 30 also includes a pair of alignment dowels 34 and 36 in order to communicate through corresponding bolt holes 102 in the starter drive housing 100 such that the starter drive housing 100 is held in precise angular and linear registration with the horizontal frame member 21. Typically, the bolt holes 102 and the starter drive housing 100 communicate with the alignment plate at a flush and planar face thereon which normally couples to a corresponding surface of the engine. However, for the purposes of refurbishing the assembly, this planar surface is utilized to couple with a similar planar surface of the alignment plate 30.

A lockable clamp 40 includes a first end 41 thereof which is attached to a reverse side of the alignment plate 30, and a second end 42 thereof which is oriented to communicate with and lock against the alignment dow 34. While an over-center type lock clamp or vice-grip type clamp has been illustrated in the preferred embodiment, it is nevertheless expected that other similar quickly removable and positive locking clamp mechanisms may be utilized in order to permit the positive coupling of the starter drive housing 100 with the alignment plate 30. The advantage of the over-center type clamp 40 is that the operator may manually close a movable handle 43 against a fixed handle 44 for securing and locking the clamp 40, while at the same time allowing the operator to quickly unlock the clamp for installation and removal.

A receiving tray 46 is coupled to the reverse side of the alignment plate 30 adjacent to the housing cutout 32. The longitudinal dimension of the receiving tray 46 is determined such that the corresponding end of the starter drive housing 100 is spaced from the end of the tray by an amount greater than the length of a tapered sleeve or bullet which will be described subsequently.

A shaft holder, shown generally as 48, is formed from a generally open channel element which is elevated above the horizontal frame member 21 in order to be in precise registration with two main bushings 107 and 109 within the starter drive housing 100 to be subsequently described. A plunger rod, shown generally as 50, is movably supported in known registration with the shaft holder 48 and the horizontal frame member 21 by paired guide supports 52 and 53. In this manner a first end 51 of the plunger rod 50 may reciprocate horizontally through the guide supports 52 and 53 in known registration with the shaft holder 48 and the main bushings 107 and 109 of the starter drive assembly 100.

The longitudinal reciprocating motion is effected by a linkage system, shown generally as 60, which includes an upper linkage 61 and a lower linkage 66. A first end of the upper linkage 61 is movably coupled about a first pivot 62 to the plunger rod 50, while a lower end of the upper linkage 61 is movably coupled to a main pivot 63 which communicates through the horizontal frame member 21. An upper end of the lower linkage 66 is movably coupled to the main pivot 63, while a lower end of the lower linkage 66 is coupled through a linkage adjustment mechanism 68 to a first end 71 of a foot actuated lever 70. A second end 72 of the foot actuated lever 70 is pivotally coupled to the lower end 23 of the vertical frame member 22. A bias spring 74 is coupled between the vertical frame member 22 and the first end 71 of the foot actuated lever 70 for elevating a foot pedal 76 attached thereto. In this manner the operator may press the foot pedal 76 which will actuate the linkage 60 in order to reciprocate in a longitudinal manner the plunger rod 50 such that the first end 51 of the plunger rod 50 will communicate through the channel of the shaft holder 48 and into the main bushing 107 of the starter drive housing 100 in a manner to be subsequently described.

While the first preferred embodiment of the present invention is described as being utilized in conjunction with a Chrysler starter motor gear reduction drive assembly, it will be apparent that other similar starter motor drive assemblies may be accommodated in this apparatus for similar operations. Specifically, the first preferred embodiment of the present invention is designed to accommodate a starter drive housing 100 for gear reduction starters manufactured by the Chrysler Corporation, part numbers 2,875,560, 3,656,575, and 3,656,650. These starter drive housings 100 include therein paired bolt holes 102 on the planar surface which couples with a similar planar surface on the main engine block. The starter drive housing 100 also includes at a lower end thereof a hollow solenoid housing 104 for receiving therein the electrical solenoid which is energized in order to engage the starter motor with the flywheel of the automotive engine. Immediately above the solenoid housing 104 is the armature shaft bushing 106 for receiving therein a distended end 171 of the armature shaft 170 having the armature 172 coupled at the opposite end thereof. The armature 172 is coupled within a field housing (not shown) within the starter motor housing (not shown), which in turn is coupled to a first end 101 of the starter drive housing 100.

With continuing reference to FIG. 2, an upper section of the starter drive housing 100 defines a gear cavity 108 for receiving therein a plurality of shafts and gears which constitute the operative portion of the gear reduction apparatus. A main gear reduction shaft 110 communicates within the gear cavity 108 and rotates between the first main bushing 107 adjacent the first end 101 of the starter drive housing 100, and a second or drive end bushing 109 adjacent the second end of the starter drive housing 100. A spline bore 121 of a main reduction gear 120 couples with the teeth of a spline section 114 adjacent one end of the gear reduction shaft 110. The circumferential gear teeth on the main reduction gear 120 are juxtaposed with and engage the gear teeth on the first end 171 of the armature shaft 170 in order to couple rotational energy therebetween. The main reduction gear 120 will then be rotated by the gear reduction shaft 110 about its axis.

A starter drive gear assembly 130 includes therein a spline bore 132 which movably couples longitudinally along a second spline section 116 of the gear reduction shaft 110 in order to couple the rotational energy therebetween. The starter drive gear assembly 130 also includes a pair of shift locks 134 for receiving therein a solenoid shift fork (not illustrated). The solenoid shift fork is actuated by the solenoid to drive the starter drive gear assembly 130 longitudinally along the gear reduction shaft 110 while these two elements rotate as one unit. In this manner a main starter drive gear 136 is forced to engage a corresponding set of teeth on the flywheel of the internal combustion engine (not shown) which projects adjacent to the end of the starter drive housing 100 having the starter drive bushing 109 and the starter drive gear 136 adjacent thereto.

The starter drive gear assembly 130 is retained longitudinally along the gear reduction shaft 110 by the operation of a gear retaining lock 118 which seats within a corresponding groove 117 within the gear reduction shaft 110. A pair of thrust washers 119 are located on the gear reduction shaft 110 on either side of the gear retaining lock 118 for protecting the starter drive gear assembly 130 and the drive end bushing 109 from excessive wear.

The operation of the first preferred embodiment in accordance with the present invention will now be explained with reference to FIGS. 1 and 2. The first step in refurbishing a starter motor gear reduction drive system is to disassemble the constituent parts of the original assembly. This may be accomplished by completing the following steps. First, the starter drive housing 100 is coupled to the alignment plate 30 such that the alignment dows 34 and 36 couple within the bolt holes 102, thereby aligning the axis of the gear reduction shaft 110 with the with the central axis of the shaft holder 48 and the plunger rod 50. Next, the clamp 40 is closed for engaging the movable end 42 against the alignment dow 34 for firmly compressing the starter drive housing 100 therebetween. Next, the gear retaining lock 118 is opened by using the appropriate tools, and is then removed to free the longitudinal motion of the main reduction gear 120 along the gear reduction shaft 110. The gear reduction shaft 110 may then be longitudinally moved toward the first end 101 of the starter drive housing 100, thereby removing the other end of the gear reduction shaft 110 from within the drive end bushing 109. This allows the gear reduction shaft 110 to be completely removed from the gear cavity 108. The constituent elements comprising the starter gear assembly may then be inspected and refurbished as required.

The assembly operation for the starter motor gear reduction drive assembly will now be discussed. The first thrust washer 119, the gear retaining lock 118 and the second thrust washer 119 are sequentially assembled on the tapered end of a bullet or tapered sleeve tool 150. The tapered end of the bullet tool 150 is placed within the gear cavity 108 and is then inserted into the drive end bushing 109 within the starter drive housing 100. Next, the starter drive gear assembly 130 is lowered into the gear cavity 108, and the solenoid actuating shift fork (not illustrated) is coupled between the shift lock guides 134 thereon. The bushing bore 136 of the starter drive gear assembly 130 is then engaged over the larger diameter end of the bullet tool 150.

Typically, the gear reduction shaft 110 will be retained within the channel of the shaft holder 48 during the refurbishing or reconstruction process. The next step requires that the operator place the main reduction gear 120 and appropriate thrust washer (not illustrated) into the gear cavity 108 adjacent the starter drive gear assembly 130 already therein. The operator then carefully inserts the lead end of the gear reduction shaft 110, that is the end adjacent the groove 117, through the reduction shaft bore 103 adjacent the first end 101 of the starter drive housing 100. This first end of the gear reduction shaft is then further inserted through the spline bore 121 of the main reduction gear 120. Additional force is typically required to move the gear reduction shaft 110, and especially the splines 116 and 114 thereon, through the spline bore 121 of the main reduction gear 120. This force is applied by having the operator depress the foot pedal 76 which forces the first end 51 of the plunger rod 50 against the end of the gear reduction shaft 110 adjacent the splines 114. Then, as the end of the gear reduction shaft 110 adjacent the snap ring groove 117 communicates adjacent the blunt end of the bullet tool 150, the starter drive gear assembly 130 is longitudinally moved toward the first end 101 of the starter drive housing 100. As additional pressure is applied by the operator to the foot pedal 76, the first end 51 of the plunger 50 forces the first end of the gear reduction shaft 110 into a coaxial recessed area in the larger diameter end of the bullet tool 150. Further pressure forces the bullet tool 150 through the bushing 109 and into the tray 46. The tapered form of the bullet tool 150 serves to enlarge the inside diameter of the gear retaining lock 118. As the bullet tool 150 is expelled through the bushing 109, the thrust washers 119 and the gear retaining lock 118 are transferred from the larger diameter end of the bullet tool 150 onto the first end of the gear reduction shaft 110. Additional force upon the first end 51 of the plunger rod 50 forces the gear retaining lock 118 into its corresponding groove 117 on the gear reduction shaft 110. This force is typically applied by having the operator depress the foot pedal 76 with periodic and sequential tapping forces in order to gently but forceably move the bullet tool 150 into and through the drive end bushing 109.

While this same general method may be utilized by substituting a sheet material having an aperture therein which acts in effect as the main drive end bushing 109 for forcing the gear retaining lock 118 and the thrust washers 119 onto the gear reduction shaft 110, it is envisioned that under most circumstances it would be more convenient to utilize the drive end bushing 109 rather than a separate aperture and sheet material. However, additional applications of this method may utilize the tapered bullet tool 150 for spreading the gear retaining lock 118, and then forcing the bullet tool 150 through an aperture in a restraining plate for enlarging the effective inside diameter of the gear retaining lock 118 and transferring it onto the the larger diameter shaft such as the gear reduction shaft 110.

Proper alignment of all of the gears with the gear reduction shaft 110 may be easily obtained by using the left hand to bias the main reduction gear 120 toward the first end 101 of the starter drive housing 100, while at the same time using the right hand to force the starter drive gear assembly 130 toward the drive end bushing 109. This action assists in the alignment of the two thrust washers 119 having the gear retaining lock 118 therebetween as the three elements are forced onto the end of the gear reduction shaft 110 adjacent the snap ring groove 117 therein.

Next, the gear retainer lock 123 is then forced into the appropriate gear retainer groove 124 adjacent the spline 114 on the gear reduction shaft 110, thereby limiting the longitudinal movement of the main reduction gear 120 along the length of the gear reduction shaft 110.

The clamp 40 may then be opened for allowing the starter drive housing 100 to be removed from the alignment dows 34 and 36. Additional steps may be required to install the cover over the gear cavity 108 and to install the solenoid and its adjacent parts within the solenoid housing 104, but these steps will probably be accomplished without the need to resort to using the present tool.

It will be noted that the same general method of utilizing a tapered sleeve to expand a retainer lock and guide it onto a larger diameter shaft may be utilized in conjunction with a surface and aperture other than the starter drive housing 100 and the drive end bushing 109 therein. For example, this surface may be coupled to a detachable clamp for being attached to a workbench. The main requirements for proper operation of this method are that: (1) the leading end of the tapered sleeve or bullet have a smaller outside diameter than the unexpanded inside diameter of the retainer lock; (2) the trailing end of the tapered sleeve have an outside diameter larger than the outside diameter of the shaft onto which the retainer lock is to be transferred; and (3) the aperture in the surface have an effective inside diameter smaller than the effective outside diameter of the retainer lock. In order to assure proper axial alignment between the shaft and the tapered sleeve it is helpful to locate an axial recessed cavity within the trailing end of the sleeve for receiving the shaft therein. The inside diameter of this cavity should be just slightly larger than the outside diameter of the shaft.

Thus, a first preferred embodiment of an apparatus and a method in accordance with the present invention have been illustrated as examples of the invention as claimed. However, the present invention should not be limited in its application to the details illustrated in the accompanying drawings or the specification, since this invention may be practiced and constructed in a variety of different embodiments. Also, it must be understood that the terminology and descriptions employed herein are used solely for the purpose of describing the general operation of the preferred embodiment and therefore should not be construed as limitations on the operability of the invention.

I claim:

1. A foot-actuated press assembly adapted to hold and operate upon an automotive gear reduction starter drive assembly and housing of the type employing a gear reduction shaft rotatable within first and second shaft bushings located generally at opposite ends of the starter drive housing, said assembly comprising in combination:

a frame;

a support plate coupled to said frame, with said support plate including thereon alignment dowels for coupling with bolt holes in the starter drive housing so as to locate a rotational axis of the gear reduction shaft in known registration with said frame;

locking means coupled to said support plate for being movably juxtaposed adjacent to said support plate for locking the starter drive housing therebetween;

plunger rod means movably coupled to said frame in known registration with said alignment dowels for operatively coupling with and exerting an axial pressure upon the gear reduction shaft in a direction toward said support plate; and foot actuated means coupled to said frame and said plunger rod means for being depressed by the foot of the operator for forcing said plunger rod means into communication with a first end of the gear reduction shaft, thereby forcing said gear reduction shaft through the shaft bushings.

2. The foot-actuated press assembly as described in claim 1 further including gear reduction shaft holding means coupled to said frame intermediate said plunger rod means and the first shaft bushing, with said gear reduction shaft holding means located in known registration with said plunger means and said alignment dowels for receiving and locating therein the gear reduction shaft in axial alignment with the first bore bushing, whereby the operation of said plunger means will engage the first end of the gear reduction shaft stored within said gear reduction shaft holding means in order to drive said gear reduction shaft through the first bore bushing within the starter drive housing.

3. The foot actuated press assembly as described in claim 2 wherein said alignment dowels are perpendicularly coupled to one side of said alignment plate, with said alignment plate including on an opposite side thereof a tray positioned adjacent the second shaft bushing for receiving articles expelled therefrom during the rebuilding process.

4. The foot-actuated press assembly as described in claim 3 wherein said plunger rod means comprises in combination:
a linear rod; and
frame coupling means for movably supporting said linear rod adjacent said gear reduction shaft holding means and the first bore bushing in the starter drive housing, with said frame coupling means limiting the motion of said linear rod to a linear motion substantially coaxial with the rotational axis of the gear reduction shaft.

5. The foot-actuated press assembly as described in claim 4 wherein:
said frame comprises a generally horizontal frame element and a generally vertical frame element adjustably coupled thereto; and wherein,
said foot-actuator means includes a foot lever pivotly coupled at a first end thereof to a lower end of said vertical frame element; and further including,
linkage means, coupled between a distended section of said foot lever and said plunger rod means for translating the vertical motion of said foot lever into horizontal motion of said plunger rod means.

6. The foot-actuated press assembly as described in claim 5 wherein said linkage means comprises in combination:
a main pivot movably coupled to said frame about an axis generally perpendicular to the gear reduction shaft;
a lower linkage having a first end thereof movably coupled to said extended section of said foot lever and a second end thereof coupled off-center to said main pivot for producing a rotation thereof responsive to said foot pedal being depressed; and
an upper linkage having a first end thereof coupled off-center to said main pivot and having a second end thereof movably coupled to said plunger rod means for producing horizontal motion thereof responsive to the rotation of said main pivot.

7. The foot-actuated press assembly as described in claim 6 wherein said locking means comprises an off-center clamp of the type which locks into a constant pressure-exerting condition when compressed beyond a critical position.

8. The foot-actuated press assembly as described in claim 1 further comprising:
a sleeve axially tapered from a smaller diameter front end to a second end having a larger diameter than the gear reduction shaft, said tapered sleeve for receiving thereon a gear lock including an axial cavity therein for coupling with the first end of the gear reduction shaft, whereby said tapered sleeve guides the first end of the gear reduction shaft through the second bushing as it expands the gear lock retainer onto the gear reduction shaft.

* * * * *